Jan. 18, 1955 R. JÄNNER 2,700,126

COPPER OXIDE RECTIFIER

Filed Sept. 27, 1949

INVENTOR.
RUDOLF JÄNNER, DECEASED
BY MARGARETE ANNA MARIE JÄNNER NEE SCHMIDT,
ADMINISTRATRIX.
BY C. M. [signature]
ATTORNEY United States Patent Office 2,700,126

Patented Jan. 18, 1955

2,700,126

COPPER OXIDE RECTIFIER

Rudolf Jänner, deceased, late of Hof on the Saale, Germany, by Margarete Anna Marie Jänner, née Schmidt, administratrix, Hof on the Saale, Germany, assignor to Siemens-Schuckertwerke Aktiengesellschaft, Erlangen, Bavaria, Germany, a corporation of Germany Application September 27, 1949, Serial No. 118,131

Claims priority, application Germany October 1, 1948

4 Claims. (Cl. 317—238)

This invention relates to electric rectifiers of the barrier layer type and particularly to copper oxide rectifiers and their manufacture.

It is an object of the invention to improve the manufacture of copper oxide rectifiers so as to permit using, as a starting material, copper of various origins or quality without detriment to the rectifier performance, rather than being limited to the highest-grade copper heretofore required for best results.

Another object of the invention is to reduce in high-quality or heavy duty rectifiers, the amount of requisite high-grade copper.

An object of the invention is to improve and simplify the manufacture of copper oxide rectifiers toward a reduced possibility of occurrence, or toward reduced detrimental effects, of contaminations that, with known manufacturing methods, may occur during the oxide forming treatment.

Figure 1:
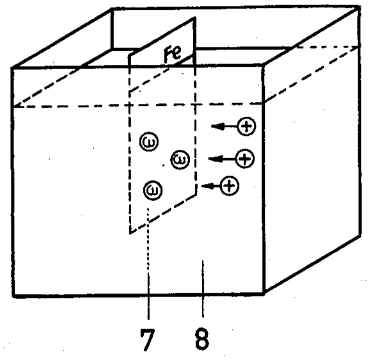
Figure 2:
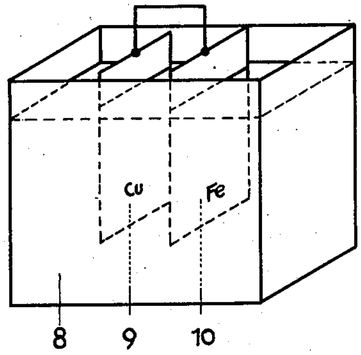
Figure 3:
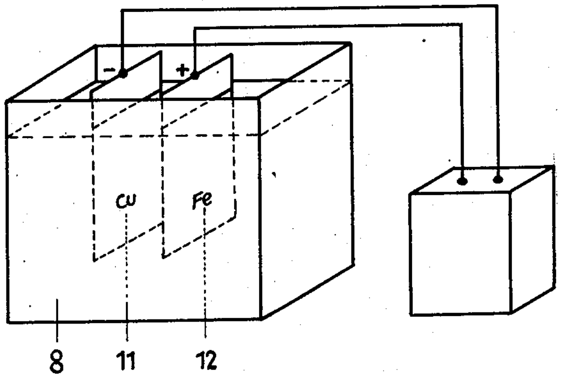
Figure 4:
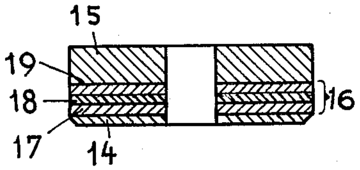

These and more specific objects of the invention, as well as the methods and means provided by the invention, for achieving these objects, will be apparent from the following description in conjunction with the drawing in which Figs. 1, 2 and 3 are schematic and explanatory illustrations of means for performing three respective variants of a copper precipitating process applicable in accordance with the invention, and Fig. 4 shows schematically and in cross section, a rectifier unit according to the invention.

Heretofore, copper of selected origin, essentially only Chile copper (CCC copper), had to be used for producing cuprous oxide rectifiers of high quality or for high current carrying duty. Even with such a copper, the obtaining of best rectifying qualities is also dependent upon the selection of especially suitable ingots, and special care had to be exercised during smelting, rolling, annealing and in the subsequent fabrication of the rectifier elements to prevent the occurrence of contaminations detrimental to the rectifying properties.

According to the invention, these drawbacks are avoided and a further improvement of the rectifying properties is achieved by producing the cuprous oxide in such rectifiers with copper precipitated, electrically or chemically, from a copper-containing solution, and by using this precipitate directly, i. e. without further melting, for the production of rectifier elements. (For distinction from the normal rectifier copper as used conventionally, the copper precipitated from solutions as required by the invention is hereinafter referred to as "precipitate copper".) A first advantage of this manufacturing method is the fact that it readily permits using any desired copper as a starting material for producing cuprous-oxide rectifiers of high rectifying qualities.

Several processes are available and applicable in conjunction with the invention for obtaining precipitate copper from copper solutions.

For instance, the precipitate copper can be deposited from such solutions on the surface of a metal which in the electro-chemical series is more negative, i. e. baser than copper. This process is carried out without using an extraneous electric current source, in accordance with the known immersion, boiling or contact methods. According to the immersion method, as schematically indicated in Fig. 1, a carrier element 7 consisting of a metal baser than copper, such as iron, is simply immersed in a copper-containing solution, for instance, a solution of copper chloride or copper sulphate, until the carrier surface is sufficiently coated with precipitate. According to the hot or boiling method, the precipitation of copper is effected in a similar manner, but at elevated or boiling temperature. The contact method represented by Fig. 2, permits obtaining increased amounts of copper precipitate by immersing in a copper-containing solution a copper plate 9 as well as the carrier plate 10, for instance of iron, and conductively interconnecting the two plates. The deposition of precipitate copper occurs on the plate 9.

Another, and especially economical process of obtaining precipitate copper involves the application of an extraneous current source (galvanic method) as exemplified by Fig. 3. Connected with the negative pole of the source is conductive plate (cathode) which is to receive the precipitate. The copper contained in the solution is converted from the ionized into the metallic state and is deposited on the cathode, while a discharge of anions occurs at the anodic plate 12. This process does not necessitate using a baser metal than copper as the precipitate carrier. For instance, the carrier plate 11 (or both plates) may consist of a copper of a quality lower than heretofore required for the oxidized electrode of cuprous oxide rectifiers.

As mentioned, the precipitate copper deposited on a carrier element according to any of the above-described processes is thereafter converted, at least in its surface zone to cuprous oxide by subjecting it to an oxidizing (formation) treatment which need not depart from that known for cuprous oxide rectifiers, although the treatment can be greatly improved, according to the invention, by measures described in a later place. It was surprisingly found that the above-mentioned precipitation methods permit depositing immediately on the carrier elements a thin layer of copper especially advantageous for the formation of cuprous oxide rectifier components. While carrier elements of metal are mentioned in the foregoing, other conductive carriers are also suitable, especially metal-coated insulating materials insofar as they satisfy the requirements of the subsequent oxide-forming and other steps of production, as is the case with porcelain and other ceramic materials coated for instance, by vaporization of metal.

After the completion of the oxidizing treatment, the oxidized carrier element is assembled with a counter-electrode which contacts the oxide surface like in the known copper oxide rectifiers. However, a rectifier unit manufactured according to the invention is nevertheless distinct from, and improved over, those made in the previously known manner. This will be recognized from the following comparison.

The essential structure of a copper-oxide rectifier according to the invention is represented by Fig. 4. The rectifier has a conductive metallic carrier 15 coated with a thin layer 16 of precipitate copper which, by the thermal oxidizing treatment, is mostly but not completely utilized for the formation of cuprous oxide. Thus, the barrier layer 18 is formed between the remainder 19 of the precipitate copper and the oxide layer 17. The oxide layer 17 is covered by a counterelectrode 4, for instance, of ductile metal such as lead. Since the carrier 15 does not have to consist of the high grade copper needed for optimum rectifier qualities of the barrier section, such rectifiers have the further advantage of requiring only a relatively small amount of highest grade copper as compared with conventional units.

In the manufacture of rectifiers according to the invention, commercial electrolytic copper was found to be especially well suitable as a carrier for precipitate copper obtained by the galvanic method. This has the advantage that the precipitate-coated carrier element, though composed of differently produced and therefore differently pure materials, nevertheless consists wholly of copper so that its component portions, having similar thermal expansion and conductance, behave similarly when the composite carrier-oxide structure is subsequently treated and fabricated into rectifier components and units.

As a rule, a degreasing treatment of such carriers of electrolytic copper is necessary before depositing thereon the precipitate copper. It was found, however, that the customary electrolytic degreasing method is unsuitable, but leads to an insufficient adhesion of the precipitate layer which may cause the occurrence of bubbles during the subsequent oxide forming treatment of the rectifier elements made of such precipitate-coated carriers. Instead, a short-lasting etching, for instance, in diluted nitric acid at elevated temperature proved to be favorable; and an additional roughening of the carrier surface by a slight anodic dissolution was also found useful.

There is an optimum thickness for the layer of precipitate copper deposited on the carrier thus prepared. Some 1/100 mm. thickness of precipitate copper is needed for the formation of the cuprous oxide layer. A remaining intermediate layer 19 in Fig. 4 of a minimum thickness of 0.03 mm. between the carrier and the cuprous oxide was found to offer the advantage of preventing, during the formation treatment, a diffusion of contaminations, detrimental to the rectifying qualities, from the carrier material to the cuprous oxide layer. On the other hand, an excessive thickness of the precipitate copper layer may lead to the inclusion of foreign substances also affecting the rectifying qualities. The most favorable thickness of the precipitate copper layer was discovered to be between 50 and 150 microns (0.050 to 0.150 mm.).

As mentioned, a discharge of anions occurs at the anode when precipitating copper by the galvanic method, resulting in a dissolution of the anode metal. To prevent an excessive premature enrichment of the bath by contaminations dissolved from the anode material, pure electrolytic copper is preferably used as anode material. Also for preventing or reducing contamination, pure or purest chemicals should be used for the bath such as purest copper sulphate, purest sulphuric acid, and copper dissolved in acids of highest available purity.

While economic considerations would suggest performing the precipitation with a bath containing copper and acid in highest concentrations, it was found that the most favorable rectifier properties of the precipitate copper are obtained with moderate copper and acid concentrations, for instance, with 200 to 300 grams copper sulphate and 30 to 50 grams sulphuric acid per liter.

As conventionally recognized, most favorable rectifying qualities are to be expected with copper of best obtainable purity while certain admixtures in definite quantities also produce desirable effects. It is another advantage of the invention that it permits a co-precipitation of admixtures to the precipitate copper by adding the proper substances to the bath, and that it is possible to accurately dose the co-precipitate, for instance, by means of accurately weighed or measured additions to the bath or by maintaining definite precipitating conditions such as current density and bath temperature. Such additions to the bath, for the purpose of co-precipitation with the bath copper, may consist of thiosulphate, sodium chloride, nitric acid, atacamite, antimony oxide, lead sulphate and other substances.

Aside from the co-precipitation of desirable admixtures, or in lieu thereof, such admixtures may be added to the carrier, or may be inserted as an intermediate layer, or added to the surface layer by other known methods, for instance, mechanically, such as by spraying or vaporizing, or electrolytically.

From the above-mentioned viewpoint of economy not only a high bath concentration, but also a high bath temperature should appear desirable for the production of precipitate copper. However, the precipitate was found to be better suitable for the purpose of the invention if the precipitate bath is kept within the range of temperatures of 20° to 30° C. The improved quality for rectifier purposes thus obtained is probably due to the especially uniform texture resulting from the low operating temperature.

Since lowest current densities result in highest purity of the precipitated copper, it should be expected that best rectifier properties are predicated upon operation at low current densities. Surprisingly, however, it was discovered that, with a manufacturing process according to the invention, superior rectifier qualities are obtained by conducting the copper precipitation at current densities above 0.5 ampere per square decimeter.

Also for securing optimum rectifier qualities, any co-precipitate of desired or undesired bath inclusions, a small amount of the latter being virtually inevitable, should be distributed as evenly as possible. A satisfactory distribution is secured at a granular size of the precipitate copper of at most 50$\mu$, probably at a grain size of about 10$\mu$. A slight surface roughness is also advantageous, but should not exceed 25$\mu$. A surface roughness of about 5$\mu$ was found especially advantageous.

When precipitating copper, as described above, onto blanks, sheets and the like carriers, the marginal zones of the precipitated layers are usually less suitable because of the uneven distribution of the current densities within the bath near the carrier edges. It is preferable, therefore, to use blanks with a precipitate-carrying surface larger than 5 cm.$^2$. If the production of rectifier elements requires smaller disc or pellet sizes, the carrier can be subdivided or reduced by conventional methods, for instance, by punching.

For securing best rectifier qualities in the manufacture of the known copper oxide rectifiers the conventional aim is to maintain a copper purity of 99.97%. Precipitate copper as produced in the manufacture according to the invention, can readily be given a still higher purity and, indeed, was found to produce best results with precipitates having a copper content of at least 99.995%. The remainder preferably, should not exceed the following maximum amounts:

| | |
|---|---|
| Lead, bismuth and nickel: not observable by wet analysis. | |
| Antimony and tin | $0.5\times10^{-3}$%. |
| Iron, sulphur and oxygen | $2\times10^{-3}$%. |
| Silver | 3 grams per ton. |

What is claimed is:

1. A barrier-layer rectifier, comprising a rectifier element having a conductive metallic carrier, a coat of precipitate copper adherent to said carrier, a surface layer of cuprous oxide formed of and integral with said coat, and a counter electrode in contact with said oxide layer.

2. A barrier-layer rectifier, comprising a carrier of rolled sheet copper, a coat of precipitate copper adherent to said carrier, a surface layer of cuprous oxide formed of and integral with said coat, and a counterelectrode in contact with said oxide layer.

3. A barrier-layer rectifier, comprising a carrier plate of copper, a coat of precipitate copper adherent to said plate, a cuprous oxide layer disposed on and integral with said coat, said precipitate copper having higher purity than said plate copper, and a counterelectrode in contact with said oxide layer.

4. A barrier-layer rectifier, comprising a conductive metallic carrier, a coat of precipitate material adherent to said carrier and having a thickness between 0.050 mm. and 0.150 mm., said coat being composed of a layer of precipitate copper adjacent to said carrier and having a thickness of at least 0.03 mm. and of a surface layer of cuprous oxide integrally joined with said precipitate copper layer, and a counterelectrode in contact with said layer of oxide.

References Cited in the file of this patent

UNITED STATES PATENTS

| | | |
|---|---|---|
| 1,749,549 | Slepian | Mar. 4, 1930 |
| 1,749,995 | Anderson et al. | Mar. 11, 1930 |
| 1,776,217 | Dooley | Sept. 16, 1930 |
| 1,797,587 | Peter | Mar. 24, 1931 |
| 1,873,363 | Tanner | Aug. 23, 1932 |
| 1,919,988 | Rupp | July 25, 1933 |
| 2,081,051 | Friederich | May 18, 1937 |
| 2,097,298 | Meyers, Jr. | Oct. 26, 1937 |
| 2,451,341 | Jernstedt | Oct. 12, 1948 |
| 2,482,178 | Harris et al. | Sept. 20, 1949 |

FOREIGN PATENTS

| | | |
|---|---|---|
| 444,013 | France | July 27, 1912 |